United States Patent [19]

Goodfellow

[11] Patent Number: 4,602,972
[45] Date of Patent: Jul. 29, 1986

[54] TIRE BREAKER ASSEMBLY

[75] Inventor: Anthony G. Goodfellow, Maghull, England

[73] Assignee: W & A Bates Limited, United Kingdom

[21] Appl. No.: 696,187

[22] Filed: Jan. 29, 1985

[30] Foreign Application Priority Data

Feb. 2, 1984 [GB] United Kingdom ............... 8402715

[51] Int. Cl.⁴ .................................................. B29D 30/38
[52] U.S. Cl. .................................... 156/111; 156/130;
156/133; 156/188; 156/190; 156/218; 156/396;
156/405.1; 156/414
[58] Field of Search ..................... 156/111, 110.1, 123,
156/124, 130, 133, 134, 126–127, 188, 190, 213,
215, 218, 394.1, 396, 405.1, 406, 406.2, 406.4,
407, 414–420

[56] References Cited

U.S. PATENT DOCUMENTS 2,407,152  9/1946  Haase ................................ 156/111
2,997,095  8/1961  Trevaskis ....................... 156/405.1
3,775,220 11/1973  Rattray ............................. 156/406

FOREIGN PATENT DOCUMENTS 2362669  6/1975  Fed. Rep. of Germany ...... 156/396

Primary Examiner—Lois E. Boland
Attorney, Agent, or Firm—Stevens, Davis, Miller & Mosher

[57] ABSTRACT

A tire breaker comprising at least two breaker plies is assembled on a carrier ring which is movable between ply fitting stations.

The ring is mounted on an arm which swings the ring through 90° to each fitting station where the ply is supported on a table. Each end of the ply is then moved from the table on to the ring by means of grippers, and rollers then traverse the ring to ensure that the ply is positioned accurately. The joints formed in successive plies are diametrically opposed to one another.

16 Claims, 7 Drawing Figures

TIRE BREAKER ASSEMBLY

This invention relates to an apparatus for and a method of the assembly of a tire breaker.

A tire breaker comprises at least two breaker plies or layers each of which comprises a weftless fabric of tire cord of metal, textile fibre glass or the like embedded in uncured elastomeric material. Such fabric is difficult to handle because it is easily mis-shaped and traditionally it is kept in a rolled condition or on a flat rigid bed until it is wound onto a tire carcass or breaker former beginning at one end and progressing to lay its length around the carcass or former until the other end is arranged to meet the first laid end. This process is usually directed by an operator who guides the strip of fabric. The carcass or former is then indexed round so that the second ply of fabric has its joint circumferentially spaced from the first ply joint to give a balanced assembly.

Such processes, however, tend to stretch the or each breaker ply or layer lengthwise and have been found most difficult to automate. It is an object of the present invention to provide an apparatus and a method of assembly which allows for automatic breaker assembly and which minimizes the forces causing distortion of the plies.

According to one aspect of the present invention an apparatus for assembling a tire breaker formed from at least two breaker plies of fabric comprises an annular breaker carrier ring mounted such that it may be moved in a plane perpendicular to the axis of the ring from a first ply fitting station to a second ply fitting station, means for moving the ring between the first and second stations, means for wrapping both ends of a ply around the ring at each station such that the carrier ring may be positioned at the first station and a ply wrapped around it and the ring is then moved in the said plane to the second station where a second ply is fitted with the positions of the joints formed between the ply ends circumferentially spaced apart.

The means for moving the ring may be a set of slides but preferably the ring is mounted at one end of a support arm which is pivotally mounted at the other end about an axis parallel to the axis of the ring so that the ring may be swung on the arm from the first fitting station to the second fitting station.

The arm may be returned to the first fitting station to fit a third breaker ply. Alternatively three or more fitting stations may be provided in the plane and the ring is moved in turn to each so that other breaker plies or layers can be assembled.

The arm pivotal axis is preferably horizontal with the arm extending upwardly. Each fitting station may comprise a substantially flat ply support table and is preferably positioned so that it is tangential to the ring presenting the centre of the length of ply on the support table to the ring. In the case of a ring mounted on an upwardly extending support arm the tables may each be conveniently mounted horizontally one on each side of the pivotal mounting or more preferably each at 45° to the horizontal so that the required arm movement is 90° and the or each breaker ply may be fed and accurately positioned on a table from above.

The means for wrapping the ends of each breaker ply around the ring may comprise a pair of arms preferably with ply grippers which have a rest position at the flat support table and means to move the grippers around the ring to lay the end of the ply around it. Preferably a set of rollers then roll around the ring to press the ply firmly into position on to the ring and roll over the joint formed by abutment of the two ply ends. Alternatively the rollers travel a limited distance sufficient to cover the whole joint. The grippers preferably move simultaneously to wrap both ends of the ply at substantially the same time. Means may be included to avoid the rollers fouling each other at the abutment joint between the ply ends.

An alternative means for wrapping the plies around the ring is to form the support tables from sheet of material which can be bent into a ring e.g. a thin steel sheet.

The carrier ring may be permanently mounted in the apparatus or may be a detachable ring which is loaded onto the end of the arm and subsequently taken away carrying the assembled breaker.

The carrier ring may be a solid rigid ring but preferably the ring has a slightly variable diameter so that it can be reduced in diameter at the time the plies are being placed in position, expanded at the time the assembled breaker is being transported and then reduced again to release the assembled breaker. This may be achieved by a series of rigid segments and providing at the end of the arm a support and drive means to provide the segment movement to give the required annulus for breaker assembly. However, a particularly effective ring comprises a ring of flexible polyurethane material which can have its diameter varied by the mechanical support used. The polyurethane ring may have a flat or a slightly domed cross-sectional shape at the support surface for the breaker assembly which surface shape is set and retained by means of a pair of rigid holding rings, one at either side of the polyurethane ring and locked against the sides of the ring to hold it at the required profile and diameter. Preferably the polyurethane ring diameter is contracted by the holding rings so that when the holding rings are released the polyurethane ring expands slightly to hold the assembled breaker securely. The polyurethane rings are then used to transport the package onwards to the next tyre building stage.

The apparatus may also include a ring pick-up device to pick up a fresh ring from a store and transport to the breaker assembly unit. The pick-up mechanism may comprise a chuck mounted beneath a rail system which moves above the breaker assembly apparatus and places the ring upon the end of the arm where it is engaged between the holding rings. Preferably the chuck picks up the ring from a store position, the ring axis being vertical, and then transported to a position where it is placed on the arm. This is the most stable position for the ring when it is not supported. A pivotal mounting in the end of the arm is provided to rotate the ring to the preferred position with axis horizontal.

Another aspect of the present invention provides a method of assembling a tire breaker comprising at least two breaker plies of fabric comprising placing each breaker ply at one of at least two ply fitting stations, moving a breaker carrier ring in a plane perpendicular to its axis to each station in turn so that the ply is substantially tangential to the ring, and wrapping at each station the ply around the ring so that a breaker is assembled onto the ring.

Preferably the ring is positioned so that its periphery touches the ply in a station substantially at the centre of the length of the ply and both ends are wrapped around the ring separately. The wrapping may be achieved by rotating a pair of arms each carrying at least one ply gripper to position the ply on the ring and to bring the ply ends into abutting relationship. The butt joint formed is then consolidated by moving rollers over the joint.

Preferably the ring is moved between the stations by swinging in an arc at one end of an arm pivotally mounted at its other end and one station is at each end of the arc. Thus the joints formed in each ply are diametrically opposed in successive plies. The ring in addition may be rotated to provide further means of positioning ply joints with respect to one another around the circumference of the breaker.

The apparatus and method may also be used to assemble sub-tread rubber and/or tread rubber over the breakers to complete the assembly of a tread and breaker package.

Further aspects of the apparatus and the method will be apparent from the following description, by way of example only, of one embodiment of the present invention in conjunction with the attached diagrammatic drawings in which.

Figure 1:
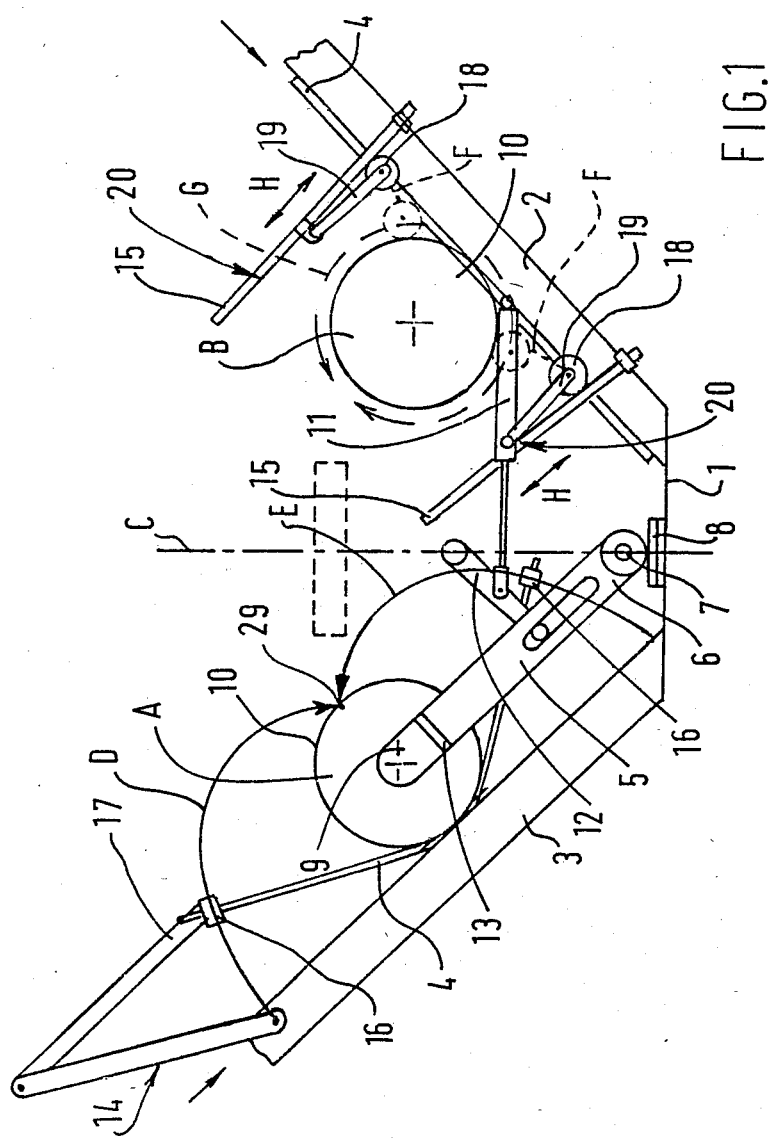
FIG. 1 is a side view of one apparatus.

As shown in FIG. 1 the breaker assembly apparatus comprises a floor mounted base plate 1 and a pair of ply support tables 2 and 3 each mounted at 45° to the horizontal and in a V-shaped configuration. Each support table 2,3 comprises a flat metal surface long enough to support a complete breaker ply 4 laid out flat. Centrally between the support tables 2 and 3 is a carrier support arm 5 which is pivoted at one end 6 about a horizontal hinge pin 7 in a floor mount 8. The other end 9 of the support arm 5 carries a breaker carrier ring 10 further details of which will be given below. The arrangement is such that the support arm 5 has two positions A and B one adjacent to each of the support tables 2 and 3 and a third central position indicated by the broken vertical line C. A hydraulically-actuated piston and cylinder assembly 11 and pivotal linkage 12 are provided to propel the arm from A to C to B as required.

The support arm 5 has a hinge 13 and adjacent to the upper end 9 on which the support ring is carried and which provides for a 90° rotation of the breaker carrier ring so that the axis of the carrier ring 10 may, in position C, be horizontal or, as shown in dotted lines in FIG. 1, be vertical. Actuator means for this 90° movement are provided on the arm 5 but are not shown in FIG. 1 for the sake of clarity.

Thus the carrier ring has the following positions:

A: with the carrier ring 10 in a first station with the ply support table 3 tangential to the ring and the ring at the centre of the length of the ply 4.

B: with the carrier ring 10 in a second station with the other ply support table 2 tangential to the ring at the centre of the length of the other ply 4, and C: with the carrier ring centrally between the first and second stations and with its axis either horizontal or vertical. This latter position is a loading and unloading position as will be explained later.

As each ply fitting station is complex the two stations in FIG. 1 have both been drawn incompletely. A complete ply station comprises a support table (2 or 3), a pair of ply end lifter systems 14, only one of which is shown in the first station A, and a pair of ply consolidation roller units 15 which are shown in the second station B.

Figure 4:
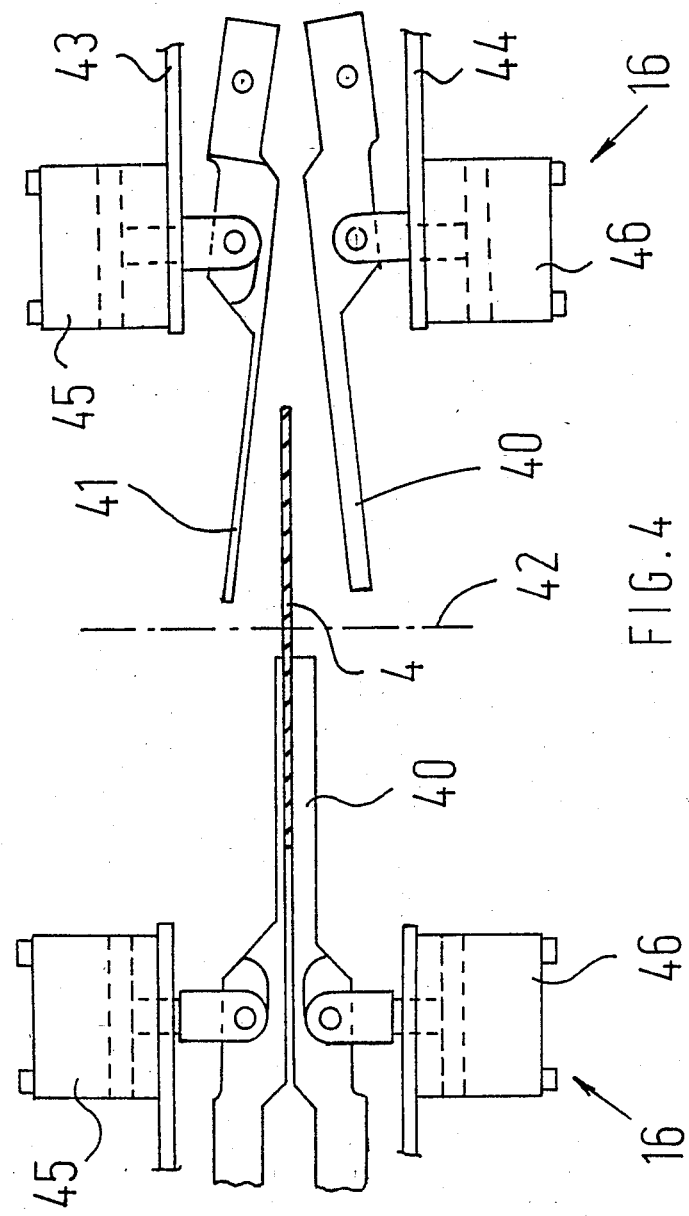
FIG. 4 is an enlarged fragmentary view of the ply grippers.

The ply end lifter systems 14 are positioned one at each end of the breaker ply 4 on the table 3. Each lifter system 14 comprises two ply grippers 16 one at each side of the ply 4 which comprises a pair of jaws 40,41 which can be closed together to take hold of the ends of the ply 4. As shown in simplified form in FIG. 4 each jaw is pivotally mounted between supporting brackets 43,44 on which are located pneumatic cylinders 45,46 to open or close the jaws. (In the Figure one pair of jaws is shown closed and the other open). The brackets are themselves supported on a jointed arm mechanism 17 (see FIG. 1) which forms part of each lifter system and which is mounted adjacent to the side of the ply 4 on its support table 3. Each gripper 16 has its jaws long enough to extend almost to the centre line 42 of the ply 4 and thus the two grippers, one from each side of the ply, are able to take a positive grip on the end of the complete ply 4. The arm mechanism 17 including cams and cam followers (not shown) provide for the end of the ply to be taken around the involute path marked by arrow D. Meanwhile the other end of the ply 4 has a similar lifter system to take it round the path marked E. The drives for the arm mechanisms 17 are not shown but are conveniently hydraulic actuators at the pivots in each arm mechanism 17. The paths for the grippers 16 are such that no tension is induced in the ply 4.

Figure 3:
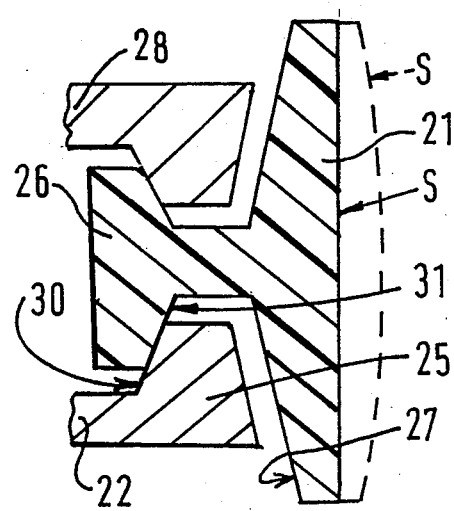
FIG. 3 is an enlarged fragmentary view of part of the carrier ring assembly shown in FIG. 2.

Ply joint consolidating roller units 15 are also provided at each table 2,3 and these are shown in the right-hand station in FIG. 1. Each unit 15 comprises a roller 18 which has a width greater than half that of the ply 4 as shown in FIG. 3 in its rest position (as shown in FIG. 1) is beneath the surface of the table and extends across the table under the ply 4. At either side of the table there is a roller support strut 19 which at one end carries an end of the roller and is slidably mounted at the other end on a steel column 20. The strut 19 can be propelled both ways along the column 20 in the direction of arrow H and the strut can be pivoted in the locus F so that by suitably synchronizing the drives the rollers can be rolled around the carrier ring 10 around the path G marked by a broken line.

Figure 5:
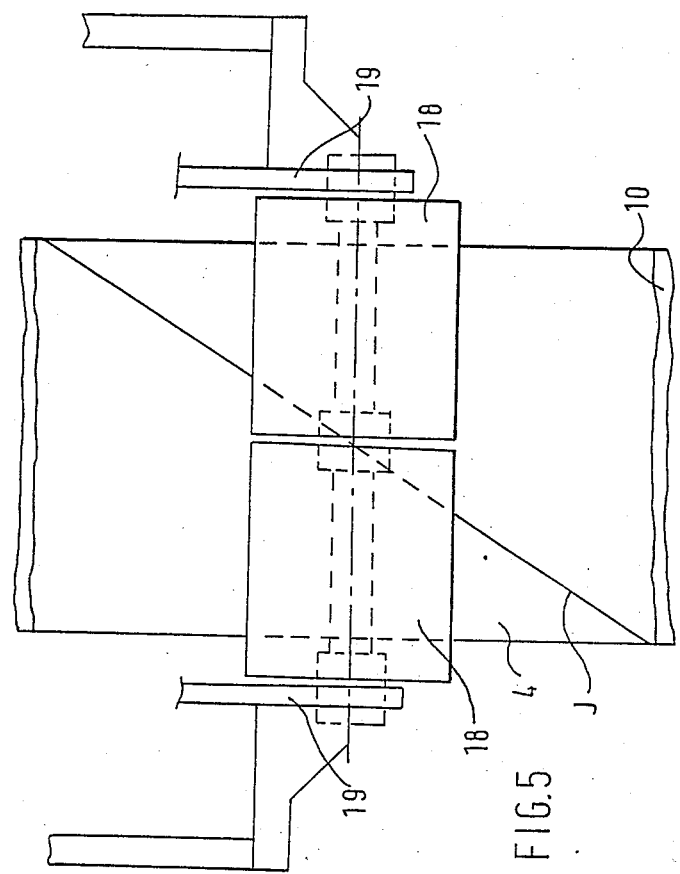
FIG. 5 is an enlarged fragmentary view of part of a roller unit.

As can be seen in FIG. 5 one of each pair of rollers 18 in each station is mounted on a strut from one side of the table (2 or 3) while the other roller is mounted on another strut from the other side. The rollers can travel in opposite directions around the ring to ensure that the ply is correctly positioned on the ring. It is to be noted that the joint formed between opposite ends of the ply 4 extends diagonally and there is an inherent tendency for the pointed ends of the ply to move towards the centre line of the ply. For this reason the two rollers each extend from beyond the respective edges of the ply to, but just short of, the centre line so that they can pass each other and roll over the joint J. In addition the axes of the rollers are not made exactly parallel to each other or to the axis of the ring. The rollers are deliberately skewed so as to tend to push the opposite edges of the ply during their traverse around the ring and to overcome the tendency of the ends of the ply to move towards the ply centre line.

Figure 6:
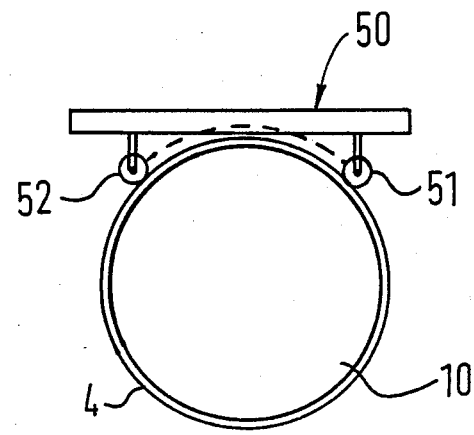
FIG. 6 is an enlarged fragmentary side view of an alternative roller unit in simplified form.
Figure 7:
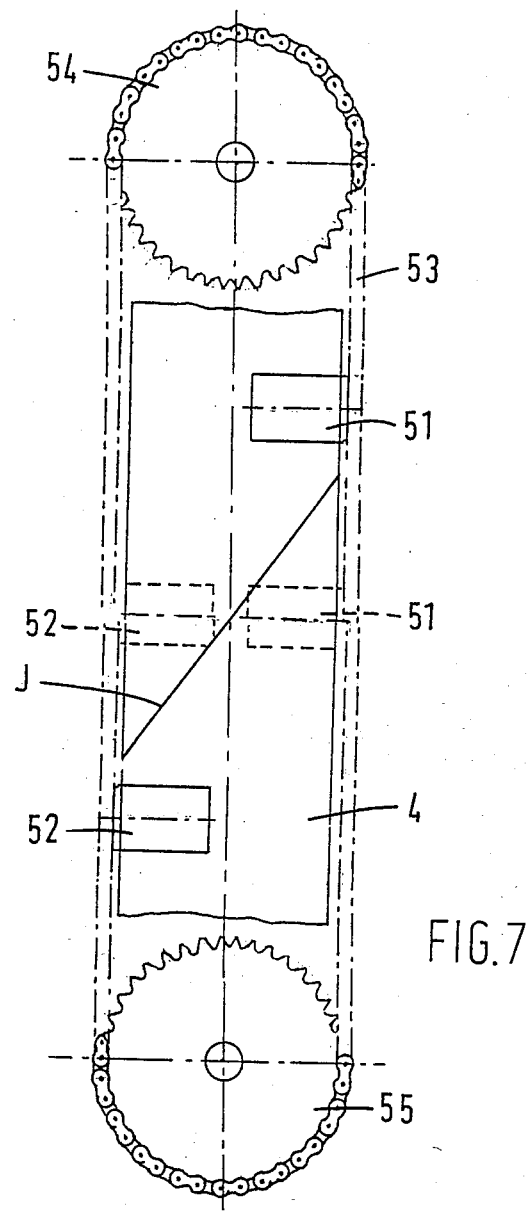
FIG. 7 is a fragmentary plan view of the alternative roller unit shown in FIG. 6, again in simplified form.

An alternative roller unit 50 is illustrated diagrammatically in FIGS. 6 and 7. The unit 50 is shown in the operative position in FIG. 6 but can be swung clear of the ring 10 when not in use by apparatus which is not shown for reasons of clarity.

The roller unit 50 comprises two rollers 51 and 52, which like the rollers 18 shown in FIG. 5 extend from opposite sides of the breaker ply 4 to end just short of the longitudinal centre line of the ply. Each roller 51 and 52 is mounted on a chain 53 which extends in a continuous loop around two sprockets 54 and 55. Each roller 51 and 52 is mounted on pneumatic piston and cylinder assemblies (not shown) which press the rollers against the ply 4 on the ring 10.

The unit is operable by driving the sprockets 54 and 55 first in one direction and then in the other to cause the rollers to move along the breaker ply 4 past one another for a circumferential distance which is slightly longer than the circumferential length of the joints, and then back to their original positions. This action consolidates the joint J.

Alternatively, other roller constructions may be used. For example two rollers may be mounted on each strut instead of the single roller as shown, one roller moving in front of the other and both consolidating the ply. In another construction each roller may be of a width greater than the width of the ring and is mounted on two struts one on each side of the table. In this case one roller is made to move in one direction around the ply and over the joint and then lifted off the ply, and the second roller travels in the opposite direction a short time after the first over the joint and under the first roller. Whatever system is used the ply must be placed in position on the ring without any stretching, compression or wrinkling, and the two ends must be brought together to form an accurate butt joint.

Figure 2:
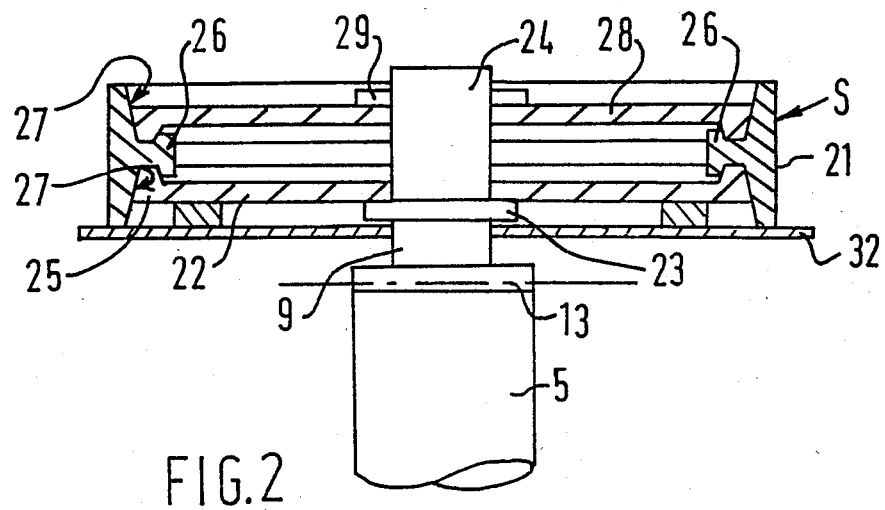
FIG. 2 is a detailed view of the carrier ring assembly of FIG. 1.

The annular breaker carrier ring 10 is shown in more detail in FIG. 2 and comprises a ring of cast polyurethane. The cross-section is basically "T"-shaped with a small foot 26 at the base. The top surface 21 of the "T"-shape is shaped so that in the unstressed condition i.e. with the ring lying free the cross-section is slightly domed but as will be explained this shape can be changed by holding the ring in different ways.

FIG. 2 shows the support arm 5 with the upper end 9 positioned so that the breaker carrier ring 10 is horizontal. The ring is in fact located upon a first holding ring comprising a cheek plate 22 which abuts a collar 23 on a mounting spigot 24 attached to the end of the arm 5. The cheek plate 22 has an edge flange 25 with a frusto-conical surface 30 shaped so that it engages with a conical surface 31 on the foot 26 to pull it radially inwards while at the same time the flange radially supports the top of the "T" at the undersurfaces 27 so that the ring surface 8 is flattened when the cheek plate 22 is pressed into the ring 10. A second holding ring comprising an identical cheek plate 28 is mounted above the ring 10 and a detachable locking collar 29 is provided which can be locked onto the spigot 24 to load the two cheek plates 22 and 28 together to set the ring 10 with its outer surface 21 substantially flat in cross-section. In FIG. 3, the initial configuration of the ring surface 5 is shown in dotted outline and the final configuration in full line. However, in FIG. 3, the two cheek plates 22 and 28 are shown in a "half-closed" position, while in FIG. 2 they are shown fully closed.

As shown in FIG. 2 (but not shown in FIG. 1 for reasons of clarity) mounted on the upper end 9 is a flat disc 32. When the breaker ply 4 is positioned on the ring, the disc acts as a guide against which the edge of the ply 4 is accurately located. The disc is not a complete ring part of the edge being cut away to prevent fouling of the lifter system 14 during the placing of a ply 4 onto the ring 10. the diameter of the disc must also be such as to avoid impeding the roller units 15 or 50 during their travel around the ring 10. Depending on the type of roller unit, two discs may be provided, one on each side of the ring 10 to act as a guide for the breaker ply 4. These discs may be mounted in several ways, for example on the two cheek plates 22 and 29, and therefore adapted to be moved with the ring 10 from one station to the other. Alternatively two pairs of discs may be mounted on the tables 2 and 3 to sandwich the ring 10 therebetween when the ring moves into engagement with a ply 4 on the table 2 or 3.

In some tire constructions the second, outer breaker ply is narrower than the first. In this situation the discs in the second fitting station are shaped accordingly so that their distance apart is less than the width of the ring 10.

The breaker assembly apparatus described is arranged to lie beneath a transporter system which has means for carrying a ring 10 to the apparatus which has the arm in the centre position C and means for putting the ring onto the spigot 24. The transporter is also able to remove the ring 10 together with an assembled breaker and put it into a conveyor system to take it on to a further process. Details of the transporter system are not given here as they are not essential for understanding of the present invention.

Breaker ply feed conveyors are also provided to position pre-cut lengths of breaker fabric ply 4 onto each table 2 and 3. the simplest such feed conveyor systems are gravity feed slides from above.

The breaker assembly apparatus operates as follows. Firstly, a first breaker ply 4 is slid downwards accurately into position on the left-hand table 3 and a second breaker ply 4 is slid downwards accurately into position on the right-hand table 2. The transporter system which carries the upper cheek plate 28 picks up the next empty carrier ring 10 from a supply conveyor and loads the ring 10 and cheek plate onto the spigot 24, the arm 5 being initially in position C (see FIG. 1). The transporter system presses the upper cheek plate 28 downwards towards the lower cheek plate 22 and, when the ring 10 is in the required loaded condition for a flat outer surface 8 of the required, slightly reduced diameter, a lock mechanism associated with the spigot 24 is operated to lock the cheek plate positions. The transporter device is then withdrawn upwards and the end 9 of the arm 5 is pivoted through 90° at the hinge 13 and the arm 5 is rotated about pivot 7 to position A where it rests on the ply 4 on the table 3. Note that the ring 10 is then in contact with the centre of the length of the first breaker ply 4 which is already accurately prepositioned on the table 3. Furthermore in this initial position the consolidation rollers 18 are beneath the table surface in their rest positions.

The two sets of ply grippers 16, one pair at either end of the ply 4, are then moved towards one another towards the centre line of the ply and the grippers are closed so that each end of the ply is held. The ply end lifter systems 14 are then operated to lift each ply end through the involute paths marked D and E and to place the ends onto the ring 10 at the point 29 and form a butt joint. As the ply grippers 16 are moved the consolidation rollers 18 are moved from their rest positions along loci F against the ply 4 on the ring 10 and then are driven around the loci G so that the ply 4 is rolled down onto the ring 10 and finally the joint is consolidated. All rollers 18 and grippers 16 are then returned to their initial rest positions. During this operation the edges of the ply 4 abut the discs 32.

The arm 5 is then swung through 90° to the second station of position B and the same sequence is used to fit the second breaker ply around the ring 10 overlying the first breaker ply. Note that the joints are spaced by 180° as required for a balanced breaker assembly of two plies.

The arm 5 is then swung back to the central position C and the transporter used to unload the upper cheek plate 28 and the ring 10 carrying the two ply breakers. The carrier ring and assembled breaker are put onto a conveyor to the next assembly stage and a second empty ring 10 is picked up and loaded into the breaker assembly apparatus.

It will be appreciated that the breaker plies are placed on the ring accurately without any stretching, tension or compression, even in only a small circumferential length of a ply, and without any other form of distortion. Care is also taken to form an accurate butt joint. The ring however is in a condition where its diameter has been slightly reduced. When the breaker has been completely assembled, the loading on the cheek plates is removed and the ring returns to a condition where its outer surface is slightly domed as shown in FIG. 3. The breaker is therefore placed in a condition whereby it is slightly tensioned equally around the whole of its circumference and in this state it is retained on the ring while being transported to the next stage of tire building. By pulling radially inwards on the foot 26 by a cheek plate mechanism, and thus reducing the diameter of the ring, the breaker can be released.

It will be appreciated that more than two breaker plies may be fitted to a ring by further visits to the tables 2 and 3 and if necessary rotation means may be provided in the arm to index the ring 10 to space the joints in the various plies. Furthermore a separate third or fourth station may be provided and the arm rotated and then swung to each in turn.

Alternative means may be used to wrap the ply around the ring but it should be noted that the ring is taken to contact the centre of each ply and this provides accurate ply positioning while the process is fully automated.

The apparatus and method may also be used to assembly sub-tread rubber and/or tread rubber over the breaker to complete assembly of a tread and breaker package.

A breaker or tread and breaker package assembled by means of the apparatus and method according to the present invention is substantially free of any form of distortion, and thus completely uniform around its whole circumference. A tire including such a breaker or package will also be more uniform in its properties.

I claim:

1. An apparatus for assembling a tire breaker formed from at least two plies of fabric comprising an annular breaker carrier ring mounted at one end of a support arm which is pivotally mounted at its other end about an axis parallel to the axis of the ring so that the ring may be swung on the arm from a first fitting station to a second fitting station, the mounting being such that the ring may be moved in a plane perpendicular to the axis of the ring from the first ply fitting station to the second ply fitting station, means for moving the ring between the first and second stations, means for wrapping both ends of a ply around the ring at each station such that the carrier ring may be positioned at the first station and a ply wrapped around it and the ring is then moved in the said plane to the second station where a second ply is fitted with the positions of the joints formed between the ply ends circumferentially spaced apart.

2. An apparatus according to claim 1 wherein the arm pivotal axis is horizontal with the arm extending upwardly.

3. An apparatus according to claim 1 wherein said station comprises a substantially flat support table.

4. An apparatus according to claim 3 wherein the support table is positioned so that it may be tangential to the ring and presents the centre of the length of the ply to the ring.

5. An apparatus according to claim 1 wherein two ply support tables are provided one in each station, the tables being inclined at 45° to the horizontal so that arm movement between the first and the second station is substantially 90°.

6. An apparatus according to claim 1 wherein the means for wrapping the ends of each ply around the ring comprises a pair of arms with ply grippers which have a rest position at the flat support table and means are provided to move the grippers around the ring to lay the ends of the ply around it, the paths of the grippers being such that no tension is induced in the ply.

7. An apparatus according to claim 1 wherein a set of consolidating rollers is provided which may be rolled along part of the circumference of the ring to press the joint formed between opposite ends of the ply to the ring.

8. An apparatus according to claim 7 wherein two rollers are provided, each extending from a respective edge of the ply to, but just short of, the longitudinal centre line of the ply.

9. An apparatus according to claim 1, wherein the ring comprises a variable diameter support ring.

10. An apparatus according to claim 9 wherein the ring comprises a flexible polyurethane ring.

11. An apparatus according to claim 1 wherein a ring pick-up device is provided to load the ring to the breaker assembly unit.

12. A method of assembling a tire breaker comprising at least two breaker plies of fabric comprising placing each breaker ply at one of at least two ply fitting stations, moving a breaker carrier ring in a plane perpendicular to its axis to each station in turn so that the ply is substantially tangential to the ring, and wrapping at each station the ply around the ring so that a breaker is assembled onto the ring and positioning the ring substantially at the centre of the length of the ply so that both ends of the ply are wrapped around the ring separately.

13. A method according to claim 12 wherein the wrapping is achieved by rotating a pair of arms each carrying at least one gripper around the ring to position the ply on the ring and to bring the ends of the ply into abutting relationship.

14. A method according to claim 13 wherein the butt joint formed between the ply ends is consolidated by moving rollers over the joint.

15. A method according to claim 12 wherein the ring is moved between the stations by swinging in an arc at one end of an arm pivotally mounted at its other end and one station is at each end of the arc so that the joints formed in each ply are diametrally opposed in successive plies.

16. A method according to claim 12 wherein the ring is rotated to position the ply joints in a desired relationship with respect to one another around the circumference of the breaker.

* * * * *